United States Patent [19]

Helary et al.

[11] Patent Number: 4,687,174
[45] Date of Patent: Aug. 18, 1987

[54] DEVICE FOR CENTERING AND GUIDING A ROLLER SUPPORTING A HEAVY COMPONENT

[75] Inventors: Jean-Louis E. Helary, Nantes; Pierre Grenon, Treillieres, both of France

[73] Assignee: Framatome & Cie., Courbevoie, France

[21] Appl. No.: 672,748

[22] Filed: Nov. 19, 1984

[30] Foreign Application Priority Data

Nov. 17, 1983 [FR] France ................................ 83 18279

[51] Int. Cl.⁴ ............................................ G21C 17/00
[52] U.S. Cl. ...................................... 248/638; 52/167
[58] Field of Search ............... 248/637, 638, 429, 346; 52/167; 74/29-31

[56] References Cited

U.S. PATENT DOCUMENTS

| | | | |
|---|---|---|---|
| 1,761,659 | 6/1930 | Cummings | 52/167 |
| 2,359,036 | 9/1944 | Harper | 52/167 |
| 3,212,745 | 10/1965 | Code | 52/167 |
| 3,568,972 | 3/1971 | Sherman | 248/429 |
| 3,986,405 | 10/1976 | Hatch | 74/29 |
| 4,009,775 | 3/1977 | Wolfelsperger | 74/29 |
| 4,462,955 | 7/1984 | Albin | 52/167 |

FOREIGN PATENT DOCUMENTS 709059 1/1968 Belgium .
2249259 10/1972 Fed. Rep. of Germany .......... 74/29

Primary Examiner—Reinaldo P. Machado
Assistant Examiner—Alvin Chin-Shue
Attorney, Agent, or Firm—Pollock, Vande Sande & Priddy

[57] ABSTRACT

Device for centering and guiding a roller for supporting a massive component, incorporating, on each bearing face of the supporting components, two centering surfaces and at least one rack which are arranged in the direction of movement of the roller. The centering surfaces and the rack which are associated with one bearing face are placed opposite the centering components and the rack associated with the opposite bearing face. The roller incorporates the cylindrical roller wheels and at least one pinion in positions corresponding to the centering surfaces and the rack. The invention applies, in particular, to anti-earthquake bearing devices for a housing for storage of nuclear fuel assemblies.

9 Claims, 7 Drawing Figures

DEVICE FOR CENTERING AND GUIDING A ROLLER SUPPORTING A HEAVY COMPONENT

FIELD OF THE INVENTION

The invention relates to a device for centering and guiding a roller in an apparatus for supporting a heavy component.

In construction works and in the installation of machinery, it is often necessary to rest heavy structures on stationary supports such as foundations or supporting slabs resting on the ground.

In particular, in nuclear reactor plants, it may be necessary, for safety, to avoid the use of those bearing devices, such as anchorages or swivelling joints, which transmit horizontal forces between the carrying structure and the component carried. These bearing devices can, in fact, endanger the structure of the supported equipment in the case of major stresses originating from the ground, for example in the event of an earthquake.

PRIOR ART

More elaborate bearing devices, which absorb or dampen the forces, have therefore been conceived.

Such a bearing device is described, for example, in French Pat. No. 2,494,397 to FRAMATOME. Such a device incorporates two sets of cylindrical rollers moving by rolling on shaped tracks machined on three bearing components, the first of which rests on the fixed base, the second of which is inserted between the two sets of rollers and the third supports the massive component. The two sets of rollers whose axes are arranged at 90° are inserted between two bearing components. The rollers comprise a cylindrical central part and two frusto-conical end parts which permit the rollers to be centered on the rolling tracks of the bearing components, the frusto-conical parts cooperating with the corresponding parts of these bearing components arranged at each of their ends in the axial direction of the roller.

Such a device permits a restricted movement of the supported component relative to the support tied to the foundations with absorption of energy, the rolling tracks of the bearing rollers having sloping paths which cause the massive component to be raised relative to the support in the event of horizontal movements of this massive component relative to the support. Moreover, this device is stable, since the component tends to return to its low equilibrium position by reverse rolling of the rollers, when the external stress which has caused its movement disappears. A stress in any direction can be resolved into two movements along the two perpendicular directions of the two sets of rollers.

However, such a device requires extremely complex machining of the bearing components and assumes the use of two sets of at least two rollers with parallel axes to avoid the risks of jamming due to skewing of the rollers.

Even in the design of this device with two sets of two rollers with parallel axes, there is, nevertheless, no certainty of perfect operation of the device, without skewing of the rollers, their guiding in their direction of movement not being ensured in a perfect manner.

More generally, when a very heavy load is moved on a roller or on a set of rollers inserted between a component carrying the massive component and a bearing component resting on the ground, these bearing components being machined to form rolling tracks for the rollers, it is desirable to produce perfect centering and perfect guiding of the rollers to avoid any locking of the device.

SUMMARY OF THE INVENTION

The aim of the invention is therefore to offer a device for centering and guiding a roller for supporting a massive component, the roller arranged with its axis horizontal being inserted between the upper bearing surface of a lower bearing component resting on the ground and the lower bearing surface of an upper bearing component, carrying the massive component, these bearing surfaces, which are substantially horizontal or slightly inclined and arranged facing each other, cooperating with the lateral surface of the roller to support the component with a possibility of horizontal movement of the component relative to the ground by rolling of the roller on the bearing surfaces, this device for centering and guiding making it possible to avoid any risk of jamming by skewing of the roller and any relative lateral movement between the massive component and the roller.

For this purpose, the device for centering and guiding comprises, on each of the bearing surfaces of the bearing components:

two surfaces for centering which are arranged in the direction of movement of the roller and inclined relative to the horizontal plane and relative to the vertical, with opposite inclinations, and at least one rack arranged in the direction of movement of the roller, the surfaces for centering and the rack of one bearing surface being placed respectively opposite the surfaces for centering and the rack of the facing bearing surface, and on the roller, in the zones corresponding to the centering surfaces and to the rack of the bearing surfaces, respectively:

at least one roller wheel with a spherical rolling surface having an axis of rotation coincident with the axis of the roller in rolling contact with at least one surface for centering during the movement of the roller, and at least one pinion with toothing corresponding to the toothing of the rack, so as to mesh with the rack.

BRIEF DESCRIPTION OF THE DRAWINGS

In order that the invention may be more clearly understood, a description will now be given, by way of non-limiting examples, with reference to the attached figures, of several embodiments of a device for centering and for guiding according to the invention, for the case of an anti-earthquake bearing device with crossed rollers, for supporting casings for storing fuel assemblies in the spent fuel pool of a nuclear reactor employing water.

DETAILED DESCRIPTION

Figure 1:
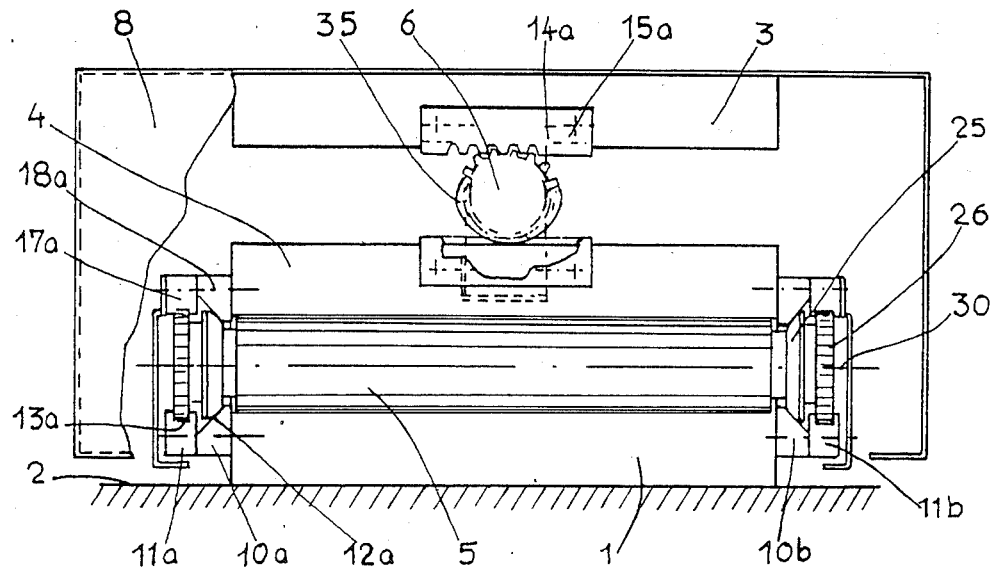
FIG. 1 shows a front elevation of the bearing device.
Figure 2:
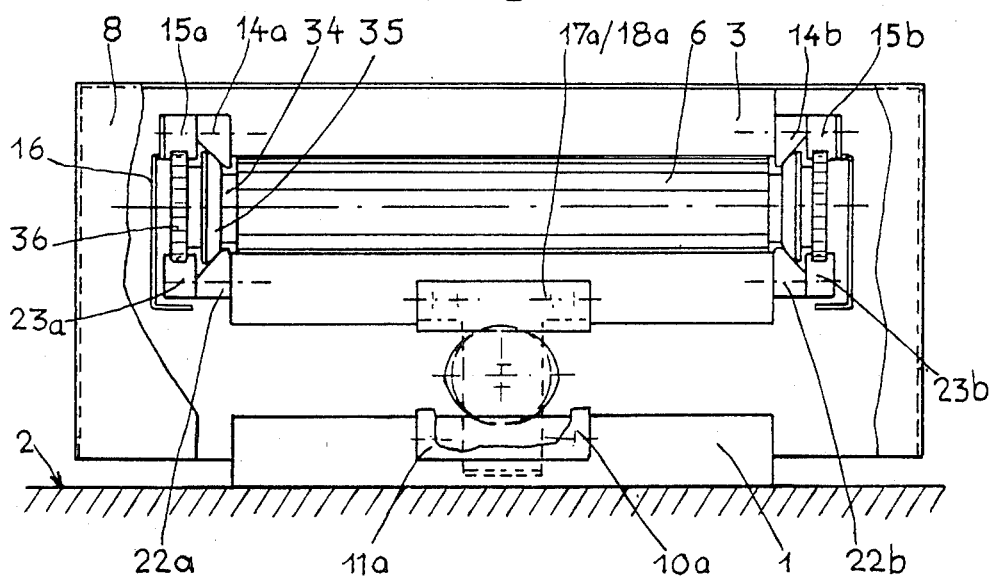
FIG. 2 shows a side view of the same bearing device.

FIGS. 1 and 2 show a bearing assembly with crossed rollers incorporating a device for centering and guiding according to the invention.

This assembly comprises a lower bearing component 1, itself resting on the bottom 2 of the fuel pool, an upper bearing component 3 on which the housing for storing fuel assemblies is resting, and an intermediate component 4 separating the two bearing rollers 5 and 6 whose axes are perpendicular.

The bearing components 1, 3 and 4 consist of simple flat plates arranged horizontally in a working position as shown in FIGS. 1 and 2. The lower roller 5 is interposed between the lower plate 1 and the intermediate plate 4 which for this roller form the lower and upper bearing components and the upper roller 6 is interposed between the intermediate plate 4 and the upper plate 3 which form respectively its lower and upper bearing components.

The whole of the device is placed inside a housing 8 which protects the device.

Figure 4:
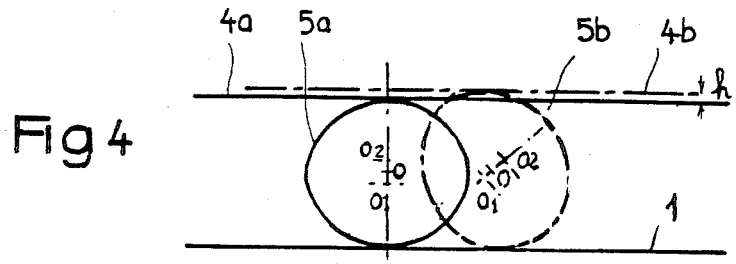
FIG. 4 is a view in cross-section of a roller such as shown in FIG. 3, in two different positions during its movement.

With reference to FIG. 4, the cross-section of the lower roller 5 can be seen in its equilibrium position 5a and its lateral end position 5b, for the case of a stressing of the component carried by the set with rollers, such as by an earthquake. The cross-section of the roller 5 is bounded by two circular arcs of identical radius but different centers. The arc of the upper circle has 01 has its center and the arc of the lower circle has 02 as center. 01 and 02 are arranged on either side of the point of intersection 0 of the section and of the axis of rotation of the roller. The point 01 is arranged below the point 0 and the center 02 above the point 0. As a result, the cross-section of the roller 5 comprises a minor axis and a major axis and the distance between the point 0 and the edge of the section of the roller increases continuously between the minor axis and the major axis. The roller 5 is interposed between the plates 1 and 4 whose upper and lower flat surfaces respectively remain constantly in contact with a generatrix of the rollers.

During a movement of the roller from 5a to 5b, as a result of a stress from outside the device, the contact generatrices move away from the axis of rotation 0 of the roller and the upper bearing component 4 moves vertically and upwards by a distance h. This flat-surfaced component moves from 4a to 4b as can be seen in FIG. 4. In its lateral end position 5b, the roller 5 is in an unstable equilibrium and, when the stress ceases, this roller tends to return to its stable equilibrium position 5a. The device therefore absorbs energy to lift the assembly carried by the roller 5 through a height h, resulting in a restriction of the movements of the device and, furthermore, this device tends to return to its stable equilibrium position.

The roller 6, as can be seen in FIG. 1, has a shape which is identical to the shape of the roller 5. In the case of a stress in any direction in the horizontal plane, the carried component will be able to move in the direction of the stress, by combined movements of the rollers 5 and 6 whose directions of movement form an angle of 90°. These movements will be accompanied by a rise h and h' of the corresponding upper bearing devices, i.e., a total vertical movement of an amplitude h+h'. Each fuel housing will be capable of being carried by a group of at least two devices such as shown in FIGS. 1 and 2, placed so that the axes of their rollers are not in line but parallel.

To obtain a perfect operation of the device, it is necessary, however, that the rollers move in a perfectly defined direction relative to the bearing components.

For this purpose, a device for centering and guiding the rollers is employed, which will be described below with reference to FIGS. 1, 2 and 3.

In FIGS. 1 and 2, it can be seen that the bearing components 1, 3 and 4 include lateral means for centering and guiding opposite corresponding means carried by the rollers.

The lower support 1 incorporates two centering components 10a and 10b together with two guiding components 11a and 11b. These components 10 and 11 are fixed rigidly on the lateral faces of the support 1 which is perpendicular to the axis of the roller 5. In position, these components for centering and guiding are centered on the support plate 1 and have a length corresponding to the permitted movement of the roller 5. The centering components 10 include a smooth track 12, inclined relative to the horizontal plane and directed upwards and towards the outside of the device, i.e., in the opposite direction from roller 5. The guiding components 11 are in the form of racks with a toothing 13 directed upwardly.

The upper support component 3 includes two components for centering 14 and two components for guiding 15, the rolling track for the centering components 14 being directed downwards and towards the outside of the device and the toothing 16 of the guiding components 15 being directed downwards.

The intermediate support component 4 comprises, on the one hand, centering and guiding components 17 and 18 arranged symmetrically relative to the corresponding components 10 and 11 fixed on the lower support 1, on one of its lateral faces, and, on the other hand, centering and guiding components 22 and 23 arranged symmetrically relative to the corresponding components 14 and 15 of the upper support 3, on its other two lateral faces.

Figure 3:
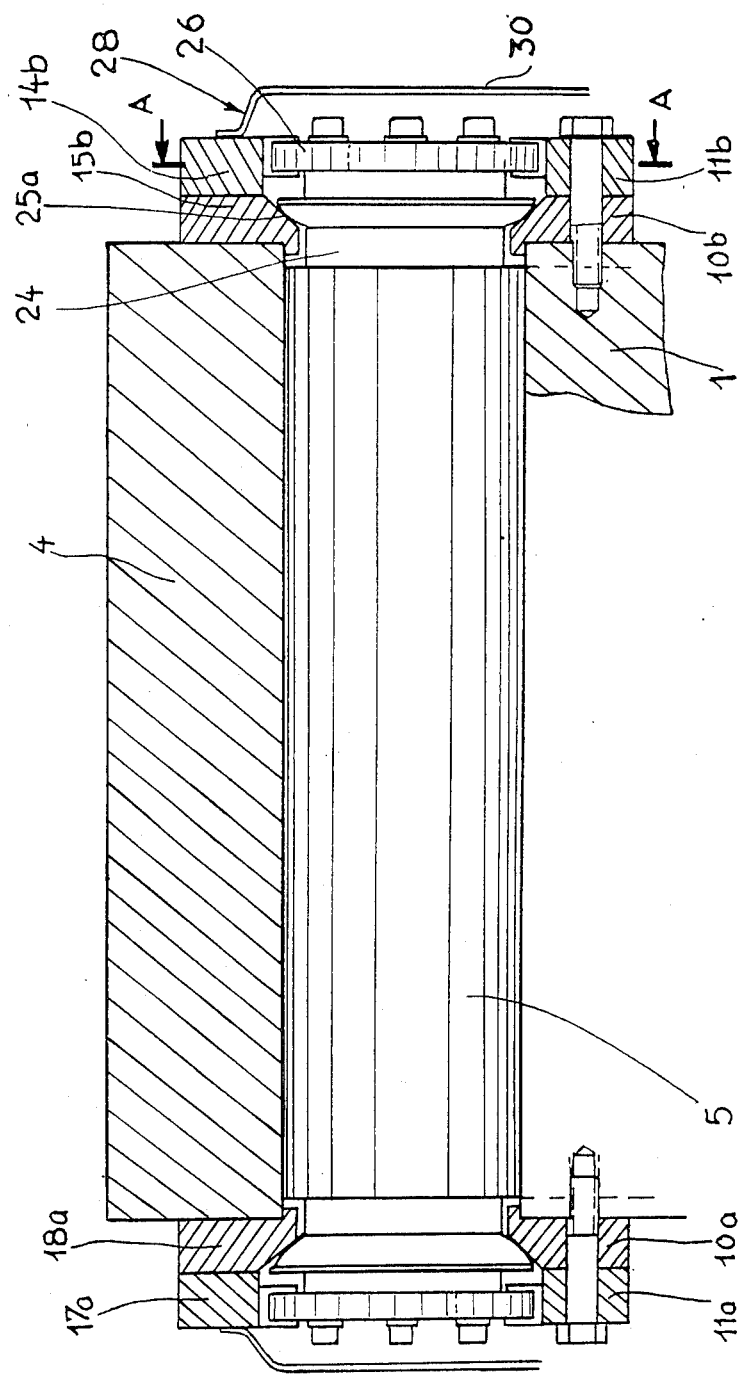
FIG. 3 is a view in partial section of the device for centering and guiding a roller of the bearing device shown in FIGS. 1 and 2.

As shown in FIGS. 1, 2 and 3, the roller 5 has an end portion 24 on which a roller wheel 25 formed with a spherical rolling surface 25a is machined or secured, e.g. with screws. At its outer end, the part 24 of the roller 5 also has a pinion 26 whose toothing corresponds to the toothing of the guiding racks 13 and 17.

The parts 25 and 26 for respectively centering and guiding the roller 5 are placed so that the roller wheel 25 can roll over the rolling tracks such as 12 of the centering components 10 and 18 and so that the pinion 26 meshes with the racks of the components 11 and 17.

A housing 30 permits the end of the roller to be closed to protect the device for centering and guiding.

The roller 6 is constructed in the same way as the roller 5 and has two ends 34 on which are mounted a pinion 36, these devices cooperating respectively with the rolling tracks of the centering components 14 and 22 and with the racks of the guiding tracks 15 and 23.

In fact, the roller wheels 25 and 35 have a cross-section, as shown in FIGS. 1 and 2, which reproduces the cross-section of the rollers 5 and 6 as shown in FIG. 4. During the movements of the roller, the roller wheels 25 and 35 thus remain in contact with the corresponding tracks 10 and 18 and 14 and 22. The rolling surfaces of the roller wheels 25 and 35 are thus formed by two spherical sectors of the same radius but whose centers are offset like the centers 01 and 02 of the rollers 5 and 6. The rollers 5 and 6 are thus centered relative to the supporting components, whatever the vertical position of these supporting components during the movements of the rollers 5 and 6.

Figure 5:
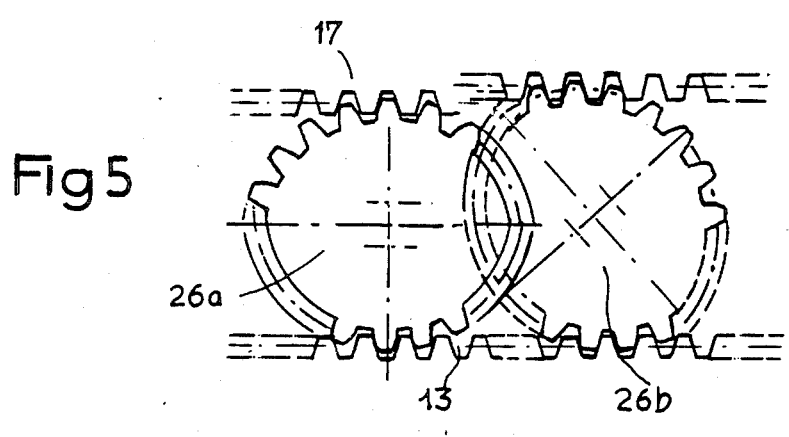
FIG. 5 is a section along A—A of FIG. 3, showing the pinion-rack assembly of the device for centering and guiding.

As can be seen in FIG. 5, the pinions 26 of the lower roller 5, which have been shown in two positions 26a and 26b corresponding to the positions 5a and 5b of the roller 5, also have a cross-section corresponding to the section of the roller 5 and the roller wheel 25. This makes it possible to keep the toothing of the pinions 26 and of racks such as 13 machined on the components 11 and 17 constantly meshing despite the vertical movement of the component 17 as shown in FIG. 5. It is thus possible to machine straight racks on the components 11 and 17.

It is obvious that the pinions 36 of the upper roller 6 are identical to the pinions 26 of the lower roller 5.

Figure 6:
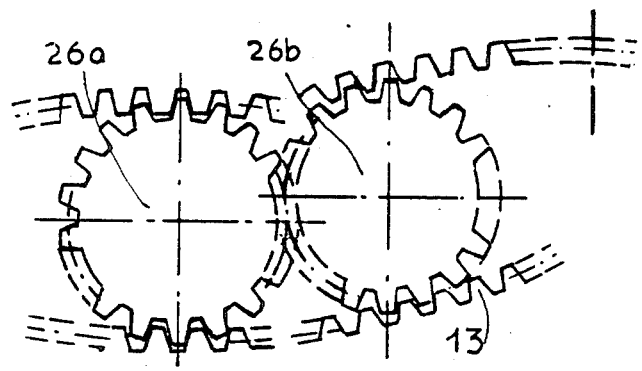
FIG. 6 is a section similar to the section of FIG. 5, for the case of an alternative embodiment of the pinion-rack assembly of the device for centering and guiding.

FIG. 6 shows an alternate embodiment of the set of pinions and racks, the pinions having a circular section and the racks being curved. The curved racks reproduce the trajectory of a point of the rollers 5 and 6 the shape of which is shown in FIG. 4. The curved shape of these racks makes it possible to keep the pinions 26 (or 36) meshing with the corresponding racks, during the movement of the roller, despite the use of pinions of circular section.

Figure 7:
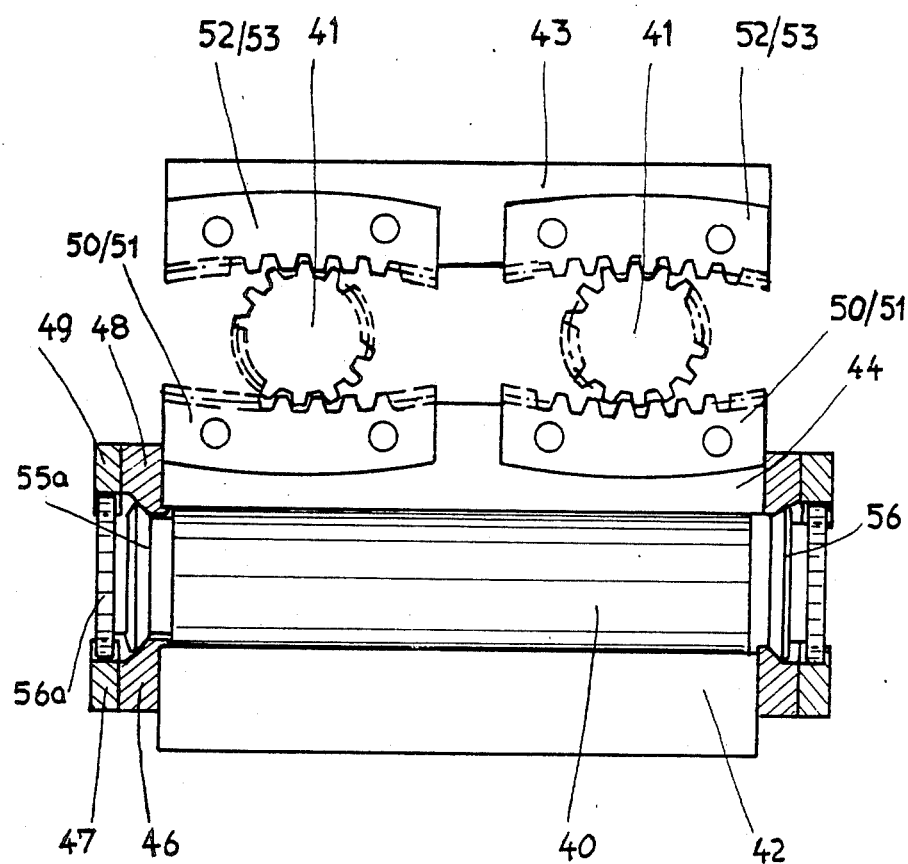
FIG. 7 is a front elevation view of a bearing device incorporating two sets of two rollers arranged with their axes at 90°.

FIG. 7 shows a bearing device for a housing for fuel assemblies, comprising two sets of two rollers 40 and 41, the axes of the rollers 40 being perpendicular to the axes of the rollers 41. These two sets of rollers are themselves interposed between supporting components 42, 43 and 44 carrying centering and guiding means 46 and 47 for the lower support 42, 48 and 49 as well as 50 and 51 for the intermediate support 44, and finally 52 and 53 for the upper support 43.

The tracks of the centering components and the guiding racks 47, 49, 51 and 53 are curved and reproduce the trajectory of a point of the rollers 40 and 41 whose section is similar to the section of the rollers 5 and 6 shown in FIG. 4.

These rollers 40 and 41 have ends carrying guiding roller wheels such as 55 and circular section pinions such as 56. A device with two sets of rollers such as shown in FIG. 7 has the advantage of being stable and facilitating the placing of the housing for fuel assemblies which it carries.

In a case of external stresses on the carried component, for example during an earthquake, these stresses being experienced mainly in the form of forces in a horizontal direction, the component undergoes a horizontal movement, since it is freely movable in any direction in the horizontal plane, on the rollers. This horizontal movement is accompanied by a vertical movement absorbing the energy involved. When the stresses cease the device returns to its equilibrium position.

During their rolling movement, the supporting rollers are continuously perfectly centered relative to the corresponding supporting plates by virtue of the rolling tracks of the guiding components fixed integrally to these supporting components. In fact, the roller wheels arranged at each of the ends of the bearing rollers remain in contact with the inclined surfaces for centering which maintain them in a perfectly centered position relative to the opposite side faces of the corresponding supporting component. Similarly, the movement is perfectly guided by the movement of the end pinions in the racks, these pinions remaining continuously enmeshed in the corresponding racks on the two supporting components between which the roller is interposed.

It can therefore be seen that any jamming of the rollers due to their skewing relative to the bearing device is avoided by virtue of the device according to the invention. Similarly the rollers must move in a direction which is perfectly perpendicular to the side faces of the supporting components.

The spherical surfaces of the bearing roller wheels also make it possible to absorb small distortions of the rollers caused by the load.

However, the invention is not restricted to the embodiments which have been described; on the contrary, it includes all the alternate forms.

Thus, instead of guiding roller wheels whose rolling surface consists of the intersection of two spherical surfaces it is possible to employ rolling wheels in the shape of simple spherical sectors, combined with curved rolling tracks reproducing the trajectory of a point of the bearing roller as it rotates.

The combined movement in the horizontal direction and in the vertical direction of the supporting components resting on the rollers can be obtained by employing rollers with a perfectly circular cross-section and rolling tracks which are inclined relative to the horizontal plane or curved. Instead of flat faces, the lower, upper and intermediate supporting devices then incorporate tracks which are inclined or curved, as in French Patent Application No. 2,494,397. The centering and guiding devices combined with such a bearing device can be made according to one of the methods which have been described. In particular, it is possible to use guiding tracks and racks which have a slope or a curvature similar to the slope or curvature of the rolling tracks for the bearing rollers. If the amplitude of the vertical movement of the load remains small, it is also possible to combine with such a bearing device comprising curved rolling tracks for the bearing rollers centering and guiding devices incorporating straight rolling tracks and racks combined with rolling wheels and pinions with circular cross-sections.

It is also possible to conceive any combination of means for centering and guiding with some kind or other of roller forming the bearing device.

It is possible to use in combination two sets of rolling tracks arranged facing the axial ends of a roller for its centering and a single set of guiding racks arranged facing the central part of the roller. Naturally in this case the roller has two roller wheels for centering at its ends and a pinion in its middle part.

It is also possible to use rolling tracks for centering which are arranged facing the middle part of the roller, and guiding racks arranged at each end of the roller which can incorporate, in this case, a roller wheel in its middle part and a pinion at each of its ends. The middle roller wheel of the roller comes into contact with the two sets of rolling tracks arranged opposite each other on the opposed bearing surfaces between which the roller is placed.

It is also possible to employ devices for centering and guiding according to the invention in the case of devices which differ from the anti-earthquake bearing devices with crossed rollers.

Such devices for centering and guiding can be employed, for example, for any means for manipulating a very massive load by means of travelling rollers. In the case of these applications the rollers may be cylindrical and the tracks flat, with the result that the devices for centering and guiding can then incorporate pinions in the shape of spherical sectors combined with rectilinear rolling tracks and pinions of a circular section combined with straight racks.

In general, the device according to the invention is applicable in the case of any handling or bearing of massive components with the use of rollers.

We claim:

1. An apparatus for supporting a heavy component comprising:
    a lower supporting component resting on the ground and having a substantially horizontal flat upper bearing surface,
    an upper supporting component for carrying said heavy component, having a substantially horizontal flat lower bearing surface parallel to and confronting said upper bearing surface,
    at least one roller having a cross section other than circular, and a horizontal axis, said roller being in contact with said upper and lower bearing surface for rolling movement along a predetermined direction, and being so shaped as to cause a lifting movement of said upper supporting component upon rolling movement thereof in either direction from a predetermined set position and,
    a device for centering and guiding said roller comprising:
    on each of said supporting components, a pair of centering surfaces extending in said predetermined direction and having opposite slopes relative to a horizontal plane and at least one rack having a flat guiding surface and extending along said predetermined direction,
    each of said centering surface of the upper supporting component being directly above an associated one of the centering surfaces of the lower supporting component and the rack of one of said upper component being directly above the rack of the other component,
    and, on said roller,
    a pair of roller wheels each having part spherical rolling surface means having an axis in coincidence with said axis of the roller and in rolling contact with two associated ones of said centering surfaces on said upper and lower supporting components, said centering surfaces and roller wheels being shaped to remain in mutual contact upon occurence of said rolling movement,
    and at least one pinion having a cross section other than circular and being arranged for simultaneous meshing with the racks on said upper and lower components.

2. A device according to claim 1, wherein
    said centering surfaces are formed on opposite lateral end portions of the supporting components corresponding to axial end portions of the roller and are sloped axially outwardly,
    each of said supporting components has two racks each arranged at one end of the associated component,
    and said roller has two of said pinions each placed axially outwardly of a bearing surface of the roller and engaging an associated pair of said racks.

3. An apparatus according to claim 1, wherein each said pinion has a generating curve approximating two circular lines with the same radius but different centers and the associated rack is straight.

4. An apparatus according to claim 1, wherein each of said rolling surface means consists of two part-spherical surfaces with the same radius but different centers and the centering surfaces for said roller wheels are planar.

5. An apparatus according to claim 1, wherein said roller has a cross-section bounded by two part-circular lines with the same radius but different centers and the bearing surfaces of the supporting components are flat and horizontal.

6. In an apparatus according to claim 1, a supplemental roller arranged with its axis at 90° from the axis of the first roller and interposed between said upper plate and a supplemental plate located above said upper plate, wherein a supplemental device for centering and guiding supplemental rollers is provided and is identical to the first centering device.

7. An apparatus for supporting a heavy component comprising:
    a lower supporting component resting on the ground and having a substantially horizontal curved upper bearing surface,
    an upper supporting component for carrying said heavy component, having a substantially horizontal curved lower bearing surface confronting said upper bearing surface,
    at least one roller having a circular cross-section and having a horizontal axis, said roller being in contact with said upper and lower bearing surfaces for rolling movement along a predetermined direction, and being so shaped as to cause a lifting movement of said upper supporting component upon rolling movement thereof in either direction from a predetermined set position, and
    a device for centering and guiding said roller comprising:
    on each of said supporting component a pair of centering surfaces extending in said predetermined direction and having opposite slopes relative to an horizontal plane and at least having a curved guiding surface and one rack extending along said predetermined direction,
    each of said centering surfaces of the upper supporting component being directly above and associated with one of the centering surfaces of the lower supporting components and the rack of one of said upper component being directly above the rack of the other component.
    and on said roller,
    a pair of roller wheels each having part spherical rolling surface means having an axis in coincidence with said axis of the roller and in rolling contact with two associated ones of said surfaces on said upper and lower supporting components, said centering surfaces and roller wheels being shaped to remain in mutual contact upon occurence of said rolling movement, and
    at least one pinion having a circular cross section and being arranged for simultaneous meshing with the racks on said upper and lower components.

8. An apparatus according to claim 7, wherein each of said part spherical rolling surface means consist of a single part spherical surface and the centering surfaces are curved.

9. An apparatus according to claim 7, wherein said roller has a circular cross-section and said bearing surfaces have opposite slopes relative to the horizontal plane from a center location.

* * * * *